Figures 1, 2:
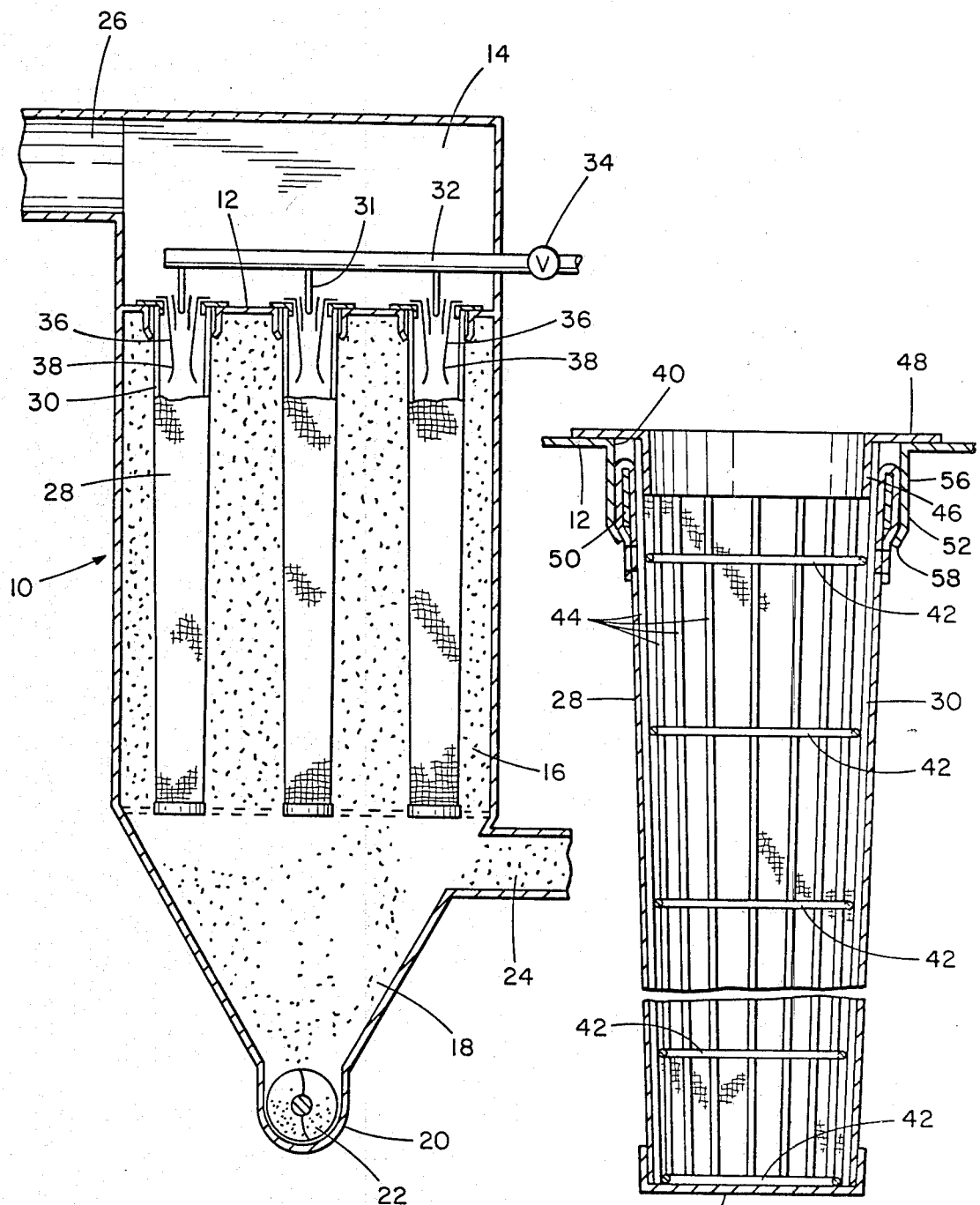

United States Patent [19]

Evenstad et al.

[11] 4,336,035
[45] Jun. 22, 1982

[54] DUST COLLECTOR AND FILTER BAGS THEREFOR

[75] Inventors: Donovan Evenstad, Olympia, Wash.; Cecil Lander, Pittsburgh, Pa.

[73] Assignee: Wheelabrator-Frye Inc., Hampton, N.H.

[21] Appl. No.: 178,431

[22] Filed: Aug. 15, 1980

Related U.S. Application Data

[63] Continuation-in-part of Ser. No. 19,425, Mar. 12, 1979, abandoned.

[51] Int. Cl.³ .............................................. B01D 46/02
[52] U.S. Cl. ............................... 55/97; 55/341 R; 55/377; 55/379; 55/381; 55/521
[58] Field of Search ............. 55/97, 341 R, 377, 379, 55/381, 521, 359

[56] References Cited

U.S. PATENT DOCUMENTS

| | | | |
|---|---|---|---|
| 1,268,304 | 6/1918 | Warren | 55/300 |
| 2,278,798 | 7/1942 | Riccardi | 55/315 X |
| 2,355,714 | 8/1944 | Eberman | 55/521 X |
| 3,377,783 | 4/1968 | Young | 55/341 R X |
| 3,431,709 | 3/1969 | Kawanami | 55/302 |
| 3,747,307 | 7/1973 | Peshina et al. | 55/379 |
| 3,826,066 | 7/1974 | Higgins | 55/341 R X |
| 4,014,672 | 3/1977 | Jansson | 55/379 X |
| 4,073,632 | 2/1978 | Reinauer et al. | 55/341 R X |
| 4,220,459 | 9/1980 | Hammond et al. | 55/341 R |

FOREIGN PATENT DOCUMENTS

| | | | |
|---|---|---|---|
| 2739311 | 3/1979 | Fed. Rep. of Germany | 55/341 R |
| 2094635 | 2/1972 | France | 55/341 R |
| 3948 | of 1913 | United Kingdom | 55/379 |

Primary Examiner—Kathleen J. Prunner
Attorney, Agent, or Firm—McDougall, Hersh & Scott

[57] ABSTRACT

A multiple filter bag assembly wherein top access is had for removal and replacement of the filter bags through openings in the cell plate subdividing the filter housing into an upper clean gas plenum chamber and a lower baghouse, wherein use is made of tapered filter bags and a cage for easing the passage of the filter bags through the openings in the cell plate during installation and removal.

4 Claims, 2 Drawing Figures

DUST COLLECTOR AND FILTER BAGS THEREFOR

This is a continuation-in-part of our copending application Ser. No. 19,425, filed Mar. 12, 1979, now abandoned, and entitled: "Dust Collector and Filter Bags Therefor."

This invention relates to a bag filter system of the type generally used in industry where pollution control for the removal of dust, dirt and particulates from air or other waste gases before reuse or release into the atmosphere, and it relates more particularly to the construction and operation of the bag filter unit whereby greater efficiency can be achieved in the filtering operation.

The invention will be described with reference to a pulse jet type baghouse filter but it will be understood that the concepts of this invention will have application to other filter bag systems wherein the dust, dirt or other particulates collect on the outside of the filter bag as the filtered air passes on through. In a pulse jet type baghouse filter, the dirty air or gas enters the filter housing in the hopper area and makes its way upwardly into the baghouse to the filter bags where the dust, dirt or other particulate is separated from the air or gas. Periodically, a pulse of highly compressed air is directed preferably downwardly through a venturi into the upper open end of the bag to create a jet pulse that operates as a back flush to remove the filter cake from the outside of the bags to clean the bags without interrupting normal filter flow. Upon removal, the filter cake falls gravitationally downwardly through the baghouse into the underlying hopper for removal from the filter housing.

At present, manufacturers of baghouse filter collectors have sought to obtain a competitive advantage by increase of the filter surface area, as by making use of filter bags of increased length. One difficulty with increasing the length of the filter bag is that more air or gas is introduced into the collector without increasing the open area between the bottom end portions of the filter bags. Thus, the velocity of the air or gas travelling in the upward direction into the baghouse is increased with increase in bag length. This increase in velocity presents a number of problems from the standpoint of efficient operation of the collector.

For example, as the upward velocity of the air or gas increases, more and more of the dust or dirt from the filter cake becomes re-entrained in the filter gas flow before it reaches the hopper. Eventually these fine dust particles work their way through the bag for passage as a pollutant with the filtered air into the atmosphere thereby greatly to reduce the filter efficiency and effect.

This is illustrated in the following tabulation which relates upward velocity to bag length, using the same bag diameter (6"), and the same bag spacing (8") at the same volume of throughput of air/dust.

TABLE I

| | Straight Bags | | | |
|---|---|---|---|---|
| Bag Length | Bag Diameter | Bag Spacing | CFM/ SF Cloth | Upward Velocity |
| 9 | 6" | 8" | 8 | 456 |
| 10 | 6" | 8" | 8 | 507 |
| 11 | 6" | 8" | 8 | 557 |
| 12 | 6" | 8" | 8 | 608 |
| 13 | 6" | 8" | 8 | 659 |
| 14 | 6" | 8" | 8 | 710 |

TABLE I-continued

| | Straight Bags | | | |
|---|---|---|---|---|
| Bag Length | Bag Diameter | Bag Spacing | CFM/ SF Cloth | Upward Velocity |
| 14 | 6" | 9.2" | 8 | 450 |

In order to reduce the upward velocity with bags having a length of 14 feet to correspond with the upward velocity with normally used 9 foot bags, the spacing between the 14 foot bags would have to be increased from 8 inches to 9.2 inches. It will be apparent that such increase in spacing, in order to accommodate 14 foot bags, results in the loss of the intended economic advantage since fewer bags can be housed in a compartment or baghouse of a given size.

It is an object of this invention to produce a bag filter system in which the velocity of dirty air or gas travelling upwardly into the baghouse is reduced thereby to enable more efficient operation with filter bags of length heretofore employed or to enable increase in the lengths of the filter bags with corresponding increase in the effective filter area without increase of the upward velocity of the air or gas to undesirable levels.

These and other objects and advantages of this invention will hereinafter appear and for purposes of illustration, but not of limitation, an embodiment of the invention is shown in the accompanying drawing in which:

FIG. 1 is a schematic sectional elevational view of a pulse jet type filter device embodying the features of this invention, and FIG. 2 is a sectional elevational view of a filter bag-cage assembly embodying the features of this invention.

It has been found, in accordance with the practice of this invention, that the lengths of the filter bags can be increased, with corresponding increase in the area of the filter surface, without increasing the upward velocity of the dirty air or gas passing through the baghouse when, instead of making use of the conventional filter bags of uniform diameter throughout their length, use is made of filter bags of elongate frustoconical shape, with the base of larger dimension uppermost in the assembly. By the same token, use of such tapered filter bags of lengths currently used in filter bag assemblies will result in reduced upward velocity of dirty gas through the filter section with corresponding increase in efficiency and operation of conventional bag filter systems.

The reduction in the crosswise dimension of the filter bag from top to bottom can be in the form of a filter bag with a uniform taper from top to bottom or the decrease in dimension from top to bottom can be incremental with corresponding reduction in the rings of the wire cages on which the filter bags are supported.

Having briefly described the basic concepts of this invention, illustration will now be made with reference to the accompanying drawings in which the filter housing is identified by the numeral 10. The filter housing is subdivided by a horizontally disposed upper cell plate 12 into an upper clean air plenum chamber 14 and a lower baghouse 16.

A collecting hopper 18 extends from the bottom of the baghouse 16 for receipt of solid particles which fall gravitationally upon separation from the ingoing side of the filter bags upon removal of the filter cake. The lower end of the hopper is formed with a channel 20 in which a screw 22 is mounted for operation to displace the collected particulates from the hopper. Other means such as a rotary air lock or cleanout door can be used for removal of collected solids.

The dirty air or gas to be cleaned is introduced into the filter housing through an inlet 24 adjacent the bottom of the baghouse and the cleaned air or gas is exhausted from the clean air plenum chamber 14 through an outlet 26.

Suspended into the baghouse 16 are one and preferably a plurality of vertically disposed filter elements 28 in the form of elongate porous members such as bags formed of such fibers as cotton, silk, hemp, or other natural fibers, glass, asbestos and the like inorganic fibers, or fibers manufactured under the name Orlon, Dacron (polyester), nylon (polyamide) or the like manmade fibers, or combinations thereof. Such bags may be in the form of woven or felted fabrics of fibers of the type described above, but it is preferred to fabricate the filter bag of fibrous fabrics characterized by good wear resistance, good chemical resistance, and fibers which are resistant to high temperatures to enable use in the treatment of gases exhausted at elevated temperatures from such chemical operations as cement plants, aluminum plants, and the like. The tubular fabric filter members are usually retained in their tubular shape by means of a suitable internal support, such as a wire cage 30 formed of metal wires and referred to in the trade as a filter cage. The cell plate 12 is formed with a plurality of openings through which the filter bag and cage extend for support from the cell plate.

Extending downwardly into the open end of the filter tube is a source of primary gas in the form of a nozzle 31 connected via a manifold 32 to a source of supply of high pressure primary gas with suitable valve means 34 for regulating the frequency and duration of the burst of high pressure primary gas from the nozzle 31.

In axial alignment with each nozzle and preferably concentrically arranged therewith is a venturi 36 dimensioned to provide an annular open space between the nozzle 31 and the venturi section for inflow of secondary gas. The nozzle or venturi section 36 is provided with a convergent section 38 which operates to increase the effective force of the jet of gas issuing from the nozzle whereby instantaneous reversal of flow is effected to cause a whipping action of the filter bags for loosening the filter cake.

In operation, the outlet 26 communicates with an exhaust fan which draws the dirty air or gas in continuous flow through the inlet 24 into the housing and then upwardly into the baghouse and through the filter bags 28 whereby particulate matter separates out on the outer ingoing side of the filter bags while the cleaned air is drawn therethrough. The filtered air or gas is drawn upwardly through the interior of the filter bags into the clean gas plenum chamber 14 from which it is exhausted into the atmosphere or otherwise used.

Filter flow is contained until the filter cake of particles separated on the ingoing side of the filter bags creates an undesirable pressure drop across the filter surface. At such time, usually at frequent intervals, a bag wash is created by operating the jets from nozzles 31 to create a pulse which flows downwardly through the interior of the filter bags to clean the bags by displacement of the filter cake. The particulates removed from the surfaces of the filter bags fall gravitationally downwardly through the baghouse into the hopper 18 where they are collected for removal from the housing. The cleaning jet pulse is created for removal of the filter cake without stopping normal filter flow with the result that the displaced particulates fall through the dirty gas stream flowing upwardly into the baghouse, as previously described.

In accordance with the practice of this invention, instead of making use of filter bags in the form of tubular members of uniform diameter substantially throughout the length thereof, the filter bags 28 are formed of a cross section diminishing from the upper end to the lower end with the result that the void area between the bags and the bottom of the baghouse is increased thereby correspondingly to decrease the upward velocity of the dirty gas or air. While the void area decreases as the cross section of the filter bags increases in the upper portions of the baghouse, the upward velocity is not undesirably increased because progressively greater amounts of air have passed through the filter bags into the interior thereof.

By decreasing the cross sectional area of the filter bags at their lower ends with corresponding increase in void area coupled with gradual increase in the cross section of the filter bags beyond their lower ends, it has become possible greatly to increase the filter surface area by lengthening the filter bags and/or increasing the cross sectional area whereby larger volumes of dirty air or gas can be cleaned without re-entrainment of particles falling gravitationally through the baghouse into the hopper.

This can be illustrated by the following example of a jet pulse collector of uniform cross sectional area having a radius of 11.25 inches and adapted to mount three filter bags within the baghouse. Comparison is made between three conventionally straight bags having a radius of 3 inches with uniformly tapered bags having a radius at the bottom of 2 inches and a radius at the top of about 4 inches to provide an average radius of about 3 inches. The bags are of conventional construction having a length of 9 feet.

EXAMPLE 1

The cross-sectional area of the collector $= \pi r^2 = \pi(11.25/12)^2 = 2.76$ ft$^2$ The cross-sectional area of the bottom of 3 tapered bags $= 3\pi r^2 = 3\pi(2/12)^2 = 0.26$ ft$^2$ The cross-sectional area of three straight bags $= 3\pi r^2 = 3\pi(3/12)^2 = 0.59$ ft$^2$ The void collector area for straight bags $= 2.17$ ft$^2$ The void collector area for tapered bags $= 2.50$ ft$^2$ If 350 CFM air/dust is allowed to flow through the collector the upward velocity in the collector with straight bags $= 350/2.17 = 161.29$ ft/min.

The upward velocity in the collector with tapered bags $= 350/2.50 = 140$ ft/min.

which is a 13% reduction in upward velocity.

Tests were run under the same conditions used in the development of Table I with the same spacing, the same number of bags and the same collector, the differences being in the use of tapered bags which decrease in diameter from top to bottom, with bags of different lengths as set forth in the following Table II:

TABLE II

| Bag Length | Tapered Bags | | Bag Spacing | CFM/ SF Cloth | Upward Velocity |
|---|---|---|---|---|---|
| | Bag Diameter | | | | |
| | Top | Bottom | | | |
| 9 | 6 | 4.71 | 8" | 8 | 287 |
| 10 | 6 | 4.57 | 8" | 8 | 308 |
| 11 | 6 | 4.43 | 8" | 8 | 329 |
| 12 | 6 | 4.29 | 8" | 8 | 348 |
| 13 | 6 | 4.14 | 8" | 8 | 364 |

TABLE II-continued

| | Tapered Bags | | | | |
|---|---|---|---|---|---|
| Bag Length | Bag Diameter Top | Bottom | Bag Spacing | CFM/ SF Cloth | Upward Velocity |
| 14 | 6 | 4.0 | 8" | 8 | 380 |

It will be apparent from the values that upward velocity with increased length of tapered filter bags varies less than with straight bags and that the velocities are lower and well within an acceptable commercial range even with bags having lengths as high as 14 feet. In general, tapered bags embodying the features of this invention are formed with a radius within the range of 3–4" at the end portion of larger dimension and a radius within the range of 2–3" at the end portion of smaller dimension.

Aside from the decrease in upward velocity with corresponding decrease in re-entrainment of dust particles, considerable benefit is derived from (1) the increased clearance between filter bags which result in less rubbing of the bags one on another, (2) ease and removal of the filter bags for replacement or repair due to the decrease in dimension of the bag which provides for increased clearance after the bag is displaced endwise upwardly through the openings 40 in the cell plate 12, and (3) the greater uniformity and velocity along the length of the bag thereby to reduce the amount of segregation or classification during filtration.

In use, the filter is supported on a wire cage 30 formed, as illustrated in FIG. 2, of a plurality of vertically spaced apart wire rings 42 and a plurality of elongate metal wires 44 positioned to extend vertically adjacent the outer periphery of the metal rings 42 in circumferentially spaced apart relation, with the wires welded, soldered, or otherwise fastened to the ring members 42 to provide a relatively rigid cage shaped to extend in substantially fitting relation within the filter bag 28 for support substantially throughout its length. The cage is provided with an angular collar 46 having a flanged portion 48 which extends outwardly beyond the opening 40 through the cell plate to rest on the adjacent portions of the cell plate 12 to support the bag and cage assembly therefrom. The bottom end of the bag 28 is closed, either by stitching or by means of a sheet and collar 50 which receives the end of the bag.

The bags can be formed with a uniform taper throughout their length or the increase in dimension can be made to occur stepwise or as a taper which begins at some point above the lower end of the bag of decreasing dimension.

Similarly, the wire cage can be formed with a corresponding configuration. Instead of a uniform taper which would require the rings 42 in each assembly to be of different dimension, considerable benefit can be derived from the standpoint of inventory, if rings of the same dimension are used at a number of successive levels to provide a stepwise increase in crosswise dimension of the cage in the upward direction. This can be tolerated because the filter bag is adapted loosely to fit on the cage when the cage is intended for the purpose of preventing collapse.

Considerable advantage is derived from the described combination of tapered filter bags and tapered cage assemblies in that the small end of the cage is telescoped into the large end of the bag whereby the ease of insertion and removal of the cage is greatly facilitated.

The above describes an important feature of this invention. This feature has application primarily to the construction wherein access to the filter bags is from an area above the cell plate 12, as described in U.S. Pat. No. 4,220,459 to Hammond et al. and entitled: "Filter Device with Top Access Filter Bag."

Access to the filter bags from the clean air plenum chamber eliminates the problem arising from the entry into the baghouse for access to the filter bags wherein the space is confining and filled with dust and dirt.

The construction described and illustrated in the drawings is for a filter device which provides for top access to the filter bags in that the openings through the cell plate are dimensioned to enable the filter bags 28 to extend therethrough into the baghouse 16. The upper end portion of the filter bags, containing a ring member 50, is confined between a cup shaped member 52 and the upper end portion of the wire cage 30 which has an upper flange 48 which extends beyond the opening to rest on the portions of the cell plate 12 adjacent the opening. Thus the wire cages and the filter bags are supported from the top side of the cell plate while depending therefrom to extend into the bag house 16. The cup shaped member 52 is dimensioned to have a tubular portion 56 slightly greater in cross section than the ring portion of the filter bag and a length greater than the length of the ring end portion, with a lip portion 58 extending inwardly from the lower end of the cup shaped member to define an opening therebetween which is less than the cross section of the ring supported end portion but greater than the cross sectional dimension of the filter bag and cage assembly so that the lip portion will be effective to prevent displacement of the ring end portion therethrough while permitting the filter bag and cage member to extend therethrough into the baghouse.

Since the opening in the cell plate and particularly the opening defined by the lip portion of the cup shaped members are of a dimension very close to that of the filter bags, difficulty is often experienced in the withdrawal of the bags from the baghouse through the cell plate.

Use of tapered filter bags, as herein described, enables the bags more easily to be withdrawn from the baghouse since the clearance between the bag and the described openings in the cell plate and/or cup shaped support member increases progressively as the bag is withdrawn from the baghouse. Thus there is little danger of injury to the bags and their removal is greatly eased.

By the same token, insertion of a bag by top access through the cell plate is greatly enhanced because of the greater clearance available when the bag is threaded through the openings until the filter bag comes to rest on its support.

The taper in the filter bags and the supporting wire cages also enhance insertion of the wire cage into the filter bag since the smaller end of the wire cage more easily telescopes into the open end of the filter bag.

While description has been made to a filter bag assembly in which the filter bag is supported between the tubular cup shaped member and the cage, the described improvement has application to filter devices wherein the cup shaped member is not employed but other means are provided for either supporting the filter bag from the cage or for supporting the filter bag and cage directly off of the cell plate, as when both the filter bag and the cage are provided with outwardly extending flange portions at their upper ends which come to rest on portions of the cell plate immediately adjacent the opening.

It will be understood that changes may be made in the details of construction, arrangement and operation without departing from the spirit of the invention, especially as defined in the following claims.

We claim:

1. In a method for operation of a multiple filter bag device having a housing and a cell plate which subdivides the housing into a lower baghouse and an upper clean air plenum chamber, said cell plate having circular openings, filter bags of circular cross section, means for releasably securing said filter bags to the cell plate such that said filter bags extend through said openings into the baghouse whereby access to the filter bags for removal or replacement is effected from the top side of the cell plate, the improvement wherein the filter bags decrease in cross section from their upper ends, and which includes the step of withdrawing the bags endwise upwardly through the cell plate openings during removal of the filter bags whereby the decreasing cross section provides increasing clearance between the bags and the cell plate during displacement of the filter bags therethrough, and installing the filter bags by inserting the filter bags through the openings in the cell plate when securing the filter bags by lowering the ends of the filter bags of smaller cross section through the openings whereby the greater clearance between the filter bags and the cell plate eases the installation of the filter bags, providing wire cages of circular cross section which decrease in cross section from their upper ends and which includes the step of inserting the wire cages with the lower ends of smaller dimension through the upper ends of the previously installed and secured filter bags to facilitate insertion of the wire cages into position of use within the filter bags and, during removal of the wire cages from the filter bags, removing the wire cages endwise through the upper ends of the filter bags for separation of the wire cages from the filter bags whereby the decreasing cross section of the wire cages provides for increasing clearance between the wire cages and filter bags during endwise displacement of the wire cages relative to the filter bags during removal, and supporting the wire cages from the cell plate independent of the filter bags by means comprising a flanged member extending outwardly from the upper end portion of each wire cage to extend beyond its associated opening in the cell plate whereby the flanged member comes to rest on the portions of the cell plate immediately adjacent the associated cell opening in the supported position.

2. In a top access multiple filter bag device having a housing, a cell plate subdividing the housing into an upper clean gas plenum chamber and a lower dirty gas plenum chamber including a baghouse, in inlet to the dirty gas plenum chamber for the introduction of gas to be cleaned and an outlet from the clean gas plenum chamber for removal of filtered gas, filter bags of circular cross section depending from the cell plate into the dirty gas plenum chamber, circular openings in the cell plate dimensioned to enable the filter bags to extend therethrough for suspension from the cell plate into the baghouse, and means for releasably securing each filter bag to the cell plate, the improvement wherein each filter bag is of decreasing cross section from the upper end portion to the lower end portion so that, as the filter bags are withdrawn from the baghouse through the openings in the cell plate, the clearance between the bags and the cell plate wall defining the corresponding openings increases to ease the removal of the filter bags, a wire cage of circular cross section is dimensioned to be received in fitting relation within each filter bag for support, with corresponding decrease in cross section from the upper end portion to the lower end portion, and means for supporting each cage from the cell plate independently of the filter bags.

3. A device as claimed in claim 2 in which the filter bags of decreasing cross section are tapered filter bags.

4. A device as claimed in claim 2 wherein the supporting means for each cage includes a flange extending outwardly from the upper end of each cage for a distance greater than its associated opening in the cell plate whereby the flange comes to rest on the portion of the cell plate about the associated opening.

* * * * *